US009728031B2

(12) United States Patent
Schultz et al.

(10) Patent No.: US 9,728,031 B2
(45) Date of Patent: Aug. 8, 2017

(54) SYSTEM AND METHOD FOR AWARDING BONUS FEATURES IN A VIDEO CAROUSEL

(71) Applicant: Bally Gaming, Inc., Las Vegas, NV (US)

(72) Inventors: David B. Schultz, Henderson, NV (US); Ian Arrowsmith, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 302 days.

(21) Appl. No.: 14/490,571

(22) Filed: Sep. 18, 2014

(65) Prior Publication Data

US 2016/0086421 A1 Mar. 24, 2016

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ...... *G07F 17/3211* (2013.01); *G07F 17/3272* (2013.01)

(58) Field of Classification Search

CPC ... G07F 17/32; G07F 17/3202; G07F 17/3211

See application file for complete search history.

(56) References Cited

U.S. PATENT DOCUMENTS

| | | | | |
|---|---|---|---|---|
| 4,837,728 | A * | 6/1989 | Barrie | G07F 17/32 273/143 R |
| 7,008,324 | B1 | 3/2006 | Johnson et al. | |
| 7,465,226 | B2 * | 12/2008 | Ikeya | G07F 17/32 463/16 |
| 7,892,088 | B2 | 2/2011 | Brandsetter et al. | |
| 8,216,046 | B2 | 7/2012 | Ikeya et al. | |
| 2006/0046822 | A1 * | 3/2006 | Kaminkow | G07F 17/32 463/16 |
| 2006/0084497 | A1 * | 4/2006 | Marks | G07F 17/32 463/20 |
| 2009/0325673 | A1 * | 12/2009 | Kelly | G07F 17/32 463/20 |

FOREIGN PATENT DOCUMENTS

| | | |
|---|---|---|
| WO | WO96/23286 | 8/1996 |

* cited by examiner

*Primary Examiner* — Kevin Y Kim

(74) *Attorney, Agent, or Firm* — Seed IP Law Group LLP

(57) ABSTRACT

A video carousel bonus feature system is disclosed that includes gaming presentations for a plurality of players, one or more game processors, and a plurality of base game cabinets that each contain base game presentations that display base games. The system also includes a video carousel with a plurality of video monitors, wherein each of the plurality of video monitors is positioned above a base game cabinet, wherein a visual representation of one or more bonus features is displayed independently on each video monitor of the video carousel. The system is configured to award one of the plurality of players at least one bonus feature that appears to move from video monitor to video monitor on the video carousel, wherein the awarded bonus feature coincides with the visual representation of the bonus feature being displayed on the video carousel monitor positioned directly above the triggering base game cabinet.

24 Claims, 10 Drawing Sheets

SYSTEM AND METHOD FOR AWARDING BONUS FEATURES IN A VIDEO CAROUSEL

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This invention pertains generally to gaming machines and gaming terminals. More particularly, this invention relates to multi-player video gaming systems.

BACKGROUND

Gaming machines have been developed having various features to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest.

Traditional mechanical gaming machines include three or more reels, with each reel having a set number of symbols spaced apart. One of the limitations of a reel-spinning, multi-game gaming machine is that the reel strips are fixed, and a mechanical reel strip cannot have its appearance or the order of the symbols easily changed. Multi-game play is further limited when symbols have to be shared with or selected from the common symbols on the reel strips.

Modern slot machines are usually theme-based, and thus, the graphics need to be customized for each theme. This can be costly and also lengthens the time it takes to manufacture them, and complicates the production-line. With video slot machines, changing graphics to coordinate with the different themes is simply a matter of software. In contrast, mechanical slot machines require a technician to change out the reels if they wanted to modify the symbols on the reels, which is a very costly and time-consuming task, and simply not an option if one desires to allow the player to change themes or game type.

Additionally, over the years, gaming machines have grown in sophistication and features to maintain player interest. For example, the mechanical reels of traditional gaming machines have been replaced with video depictions of spinning reels. Additionally, secondary displays and combination games have been implemented. Accordingly, there is a continuing need for gaming machine variants that provide a player with enhanced excitement without completely departing from more traditional gaming machine concept.

SUMMARY

Briefly, and in general terms, disclosed herein are systems and methods for providing a multi-player video gaming system. One embodiment of the video carousel bonus feature system is a multi-player video gaming system that includes gaming presentations for a plurality of players, one or more game processors, and a plurality of base game cabinets that each contain base game presentations and display a reel base game. Another aspect of such an embodiment includes a video carousel with a plurality of video monitors, wherein each of the plurality of video monitors is positioned above a base game cabinet, wherein a visual representation of one or more bonus features is displayed independently on each video monitor of the video carousel. Continuing, the system also includes a memory storage device storing instructions to be executed by at least one of the processors and configured to (1) award one of the plurality of players at least one bonus feature based on triggering criteria at a base game cabinet, wherein the awarded bonus feature coincides with the visual representation of the bonus feature being displayed on the video carousel monitor positioned directly above the triggering base game cabinet, and (2) manipulate the visual representation displayed on each video monitor in the video carousel such that the visual representations of the bonus features appear to move from video monitor to video monitor.

The disclosed embodiments further relate to machine readable media on which are stored embodiments of the disclosed invention described herein. It is contemplated that any media suitable for retrieving instructions is within the scope of the disclosed embodiments. By way of example, such media may take the form of magnetic, optical, or semiconductor media. The invention also relates to data structures that contain embodiments of the disclosed invention, and to the transmission of data structures containing embodiments of the disclosed invention.

Further advantages of the disclosed embodiments will be brought out in the following portions of the specification, wherein the detailed description is for the purpose of fully disclosing the various embodiments without placing limitations thereon.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Figure 1A:
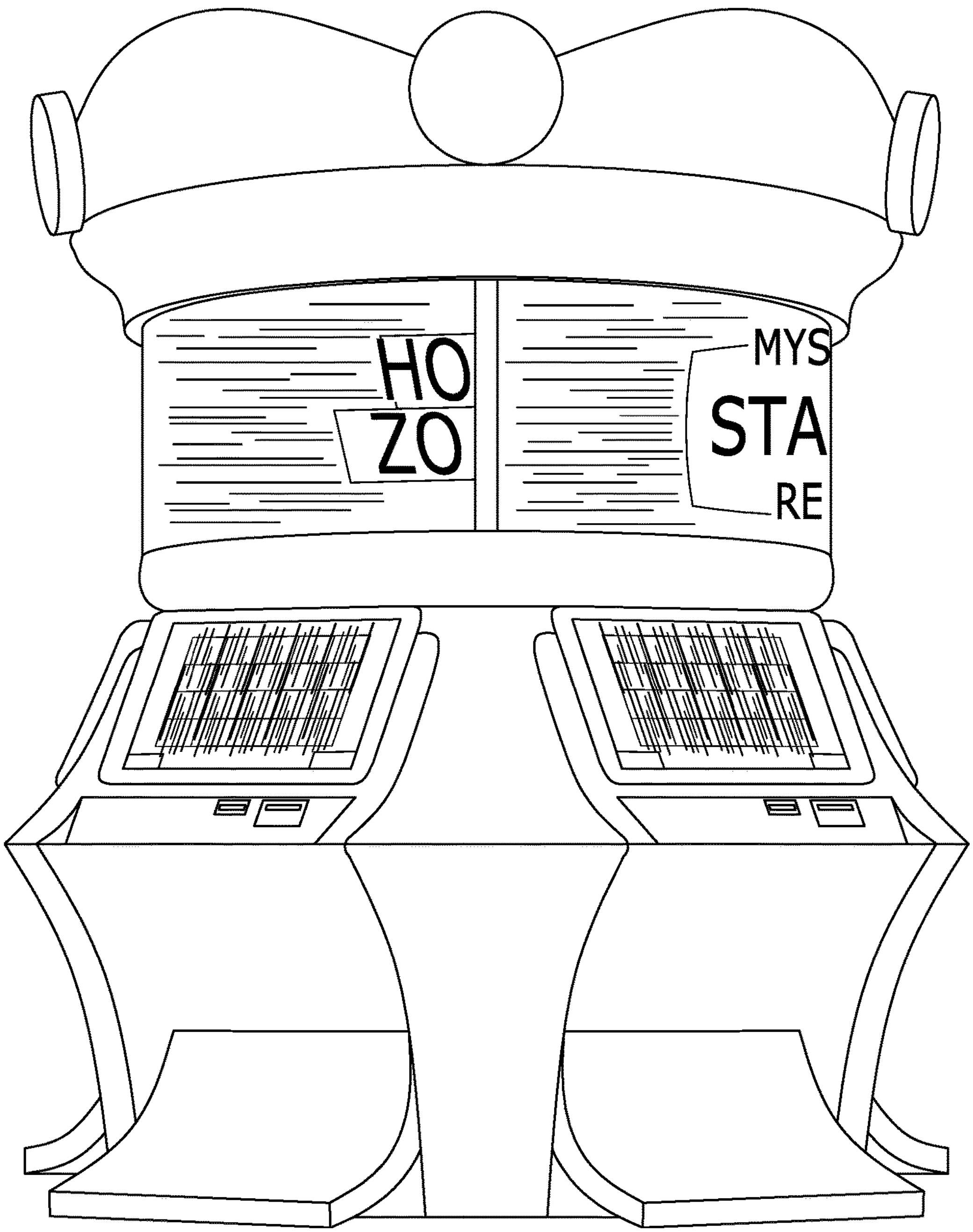
FIG. 1A illustrates a front view of a multi-player base game and video carousel gaming system while the video carousel gaming system displays spinning content.

Persons of ordinary skill in the art will understand that the present disclosure is illustrative only and not in any way limiting. Other embodiments of the presently disclosed system and method readily suggest themselves to such skilled persons having the benefit of this disclosure.

Each of the features and teachings disclosed herein can be utilized separately or in conjunction with other features and teachings to provide a system and method to provide user-configurable rules for team play on a single gaming machine. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "configuring," "determining," "displaying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 1B:
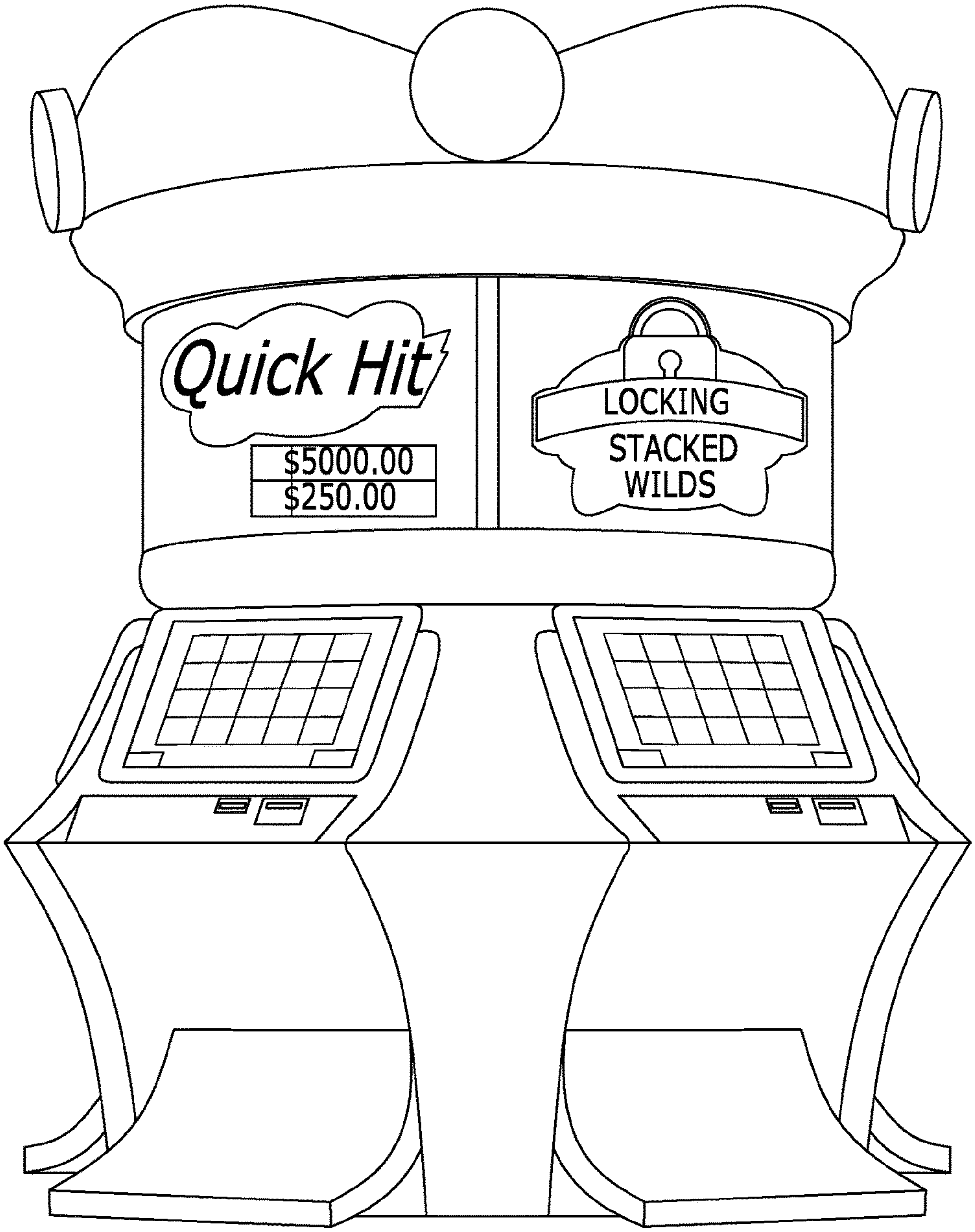
FIG. 1B illustrates a front view of a multi-player base game and video carousel gaming system while the video carousel gaming system displays stopped content.
Figure 2:
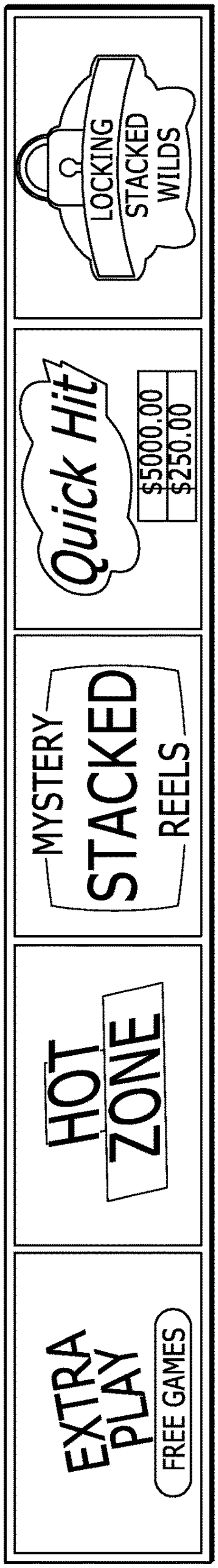
FIG. 2 illustrates only the video carousel portion of the gaming system.

FIGS. 1A, 1B, and 2 illustrate various embodiments of the disclosed Video Carousel Bonus Feature System and Method that are employed in a video gaming system. One embodiment of the video carousel bonus feature system is a multi-player video gaming system that includes gaming presentations for a plurality of players, one or more game processors, and a plurality of base game cabinets that each contain base game presentations and display a reel base game. Another aspect of such an embodiment includes a video carousel with a plurality of video monitors, wherein each of the plurality of video monitors is positioned above a base game cabinet, wherein a visual representation of one or more bonus features is displayed independently on each video monitor of the video carousel. Continuing, the system also includes a memory storage device storing instructions to be executed by at least one of the processors and configured to (1) award one of the plurality of players at least one bonus feature based on triggering criteria at a base game cabinet, wherein the awarded bonus feature coincides with the visual representation of the bonus feature being displayed on the video carousel monitor positioned directly above the triggering base game cabinet, and (2) manipulate the visual representation displayed on each video monitor in the video carousel such that the visual representations of the bonus features appear to move from video monitor to video monitor.

Some embodiments of the Video Carousel Bonus Feature System and Method enable players to see which bonus features will be awarded from a multitude of available features. This may be determined based on which specific bonus feature is currently being represented on a video monitor of the video carousel positioned above the base game cabinet. This capability adds excitement and anticipation to the play experience as the "current" feature changes periodically based on predetermined criteria. In some embodiments, the software may be architected in such a manner that additional features may be added to the available set of possible awarded features after the games have been deployed, adding even more flexibility and excitement to the method.

In one non-limiting embodiment of the Video Carousel Bonus Feature System and Method, the system features a video carousel consisting of five convex video monitors, each of which is positioned above, and is correlated to, a base game cabinet (and base game within that cabinet). Each convex monitor displays an image representing a feature or plurality of features. When the criterion for triggering the feature for that cabinet is met, the player is awarded the feature associated with the image currently displayed on the video monitor of the video carousel directly above the player's base game cabinet. The feature may be related specifically to the triggering game, or may be a feature common to all games in the video carousel.

One non-limiting embodiment of the Video Carousel Bonus Feature System and Method includes features related to a Drop Zone game, in which Wild symbols appear in the video carousel monitor above the triggering base game cabinet and appear to drop and land on the correlating base game. Another non-limiting embodiment of the Video Carousel Bonus Feature System and Method includes features related to a Quick Zone game, in which a multitude of Quick Hit symbols appear in the video carousel monitor above the triggering base game cabinet and appear to drop and land on the correlating base game. Continuing, still another non-limiting embodiment of the Video Carousel Bonus Feature System and Method includes features related to a Bet Multiplier game, in which a player is awarded credits equal to a multiple of their bet ranging from 3× to 100×. Yet another non-limiting embodiment of the Video Carousel Bonus Feature System and Method includes features related to a unique set of free games that use a symbol set and pay table not available on the triggering base game. Furthermore, still another non-limiting embodiment of the Video Carousel Bonus Feature System and Method includes features related to a pick feature in which the player may be awarded a progressive amount.

The Video Carousel Bonus Feature System and Method described herein enables virtually any traditional gaming feature to be awarded. In addition, the software architecture of the Video Carousel Bonus Feature System and Method enables new features to be added after the carousel is initially deployed to maintain the uniqueness and excitement of the game bank.

As described above, the Video Carousel Bonus Feature System and Method enables the visual representation of features on the video monitors in the video carousel. In one embodiment, the visual representation of a single bonus feature is presented on each video monitor, with each video monitor displaying either the same or different features as text, graphics, or a combination of text and graphics. In another embodiment, the visual representation of a plurality of bonus features presented on each video monitor, with each monitor displaying either the same or different pluralities as text, graphics, or a combination of text and graphics. Additionally, in this embodiment a method is implemented for determining which of the plurality of bonus features is awarded after the feature has been awarded (e.g. player pick, wheel, and the like). In still another embodiment, any combination is implemented of either a single bonus feature or a plurality of bonus features on each monitor (any or all of which may be duplicated on multiple monitors). In yet another embodiment, the visual representation that is implemented is a "mystery" representation which is not revealed to the player until the bonus feature is awarded. Continuing, in another embodiment the visual representation that is implemented is one or more progressive bonus features, at least one of which may be paid when that feature is awarded.

In other embodiments, the Video Carousel Bonus Feature System and Method enables the awarding of a feature game represented on the correlated video monitor (of the video carousel) above the base game cabinet. In one such embodiment, one or more special symbols on the base game appear on the correlated video monitor (of the video carousel) above the base game cabinet a manner prescribed by the game rules. In another such embodiment, a random coin-in mystery symbol is determined probabilistically, with or without a controller linked to all of the base games, and appears on the correlated video monitor (of the video carousel) above the base game cabinet. In another such embodiment, a random time-based mystery symbol is determined probabilistically with or without a controller linked to all the base games, and appears on the correlated video monitor (of the video carousel) above the base game cabinet.

In still another such embodiment, the Video Carousel Bonus Feature System and Method enables the awarding of a pre-determined coin-in with each subsequent value derived randomly immediately upon triggering a feature. In yet another embodiment, the system enables the awarding of a secondary feature award based on an initial feature awarded in any of the above described methods. Continuing, in another embodiment, the system enables awarding directly by the player upon making a selection and appropriate wager to initiate the current feature immediately as prescribed by the rules. Furthermore, in another embodiment, the system enables a player to be awarded multiple features which may result in the manipulation of images upon completion of each awarded feature.

With respect to another aspect of the video carousel bonus feature system, methods are described below of manipulating the images displayed on each convex video monitor in the video carousel such that the visual representations of the features appear to move from monitor to monitor or otherwise change position or content based on predetermined criteria.

In one embodiment of the video carousel bonus feature system, one or more special symbols appearing in a base game causes all the images in the video monitors of the video carousel to rotate (clockwise or counter-clockwise) one or more positions either randomly or as dictated by the symbol per the game rules (e.g., a numeric value on the symbol or color/shape is associated with a direction and a specific number of positions to rotate), while preserving relative display order. In another embodiment of the video carousel bonus feature system, one or more special symbols appearing in any base game cause all the images in the video monitors of the video carousel to "spin" (clockwise or counter-clockwise) and land randomly in the same or new positions preserving relative display order. In still another embodiment of the video carousel bonus feature system, one or more special symbols appearing in any base game causes all the images in the video monitors of the video carousel to relocate to random positions which may include reappearing in the current position.

In some embodiments of the video carousel bonus feature system, a random coin-in mystery symbol, which is determined probabilistically with or without a controller linked to all the base games, causes all of the images in the video monitors of the video carousel to rotate (clockwise or counter-clockwise) one or more positions while preserving relative display order. In other embodiments of the video carousel bonus feature system, a random coin-in mystery symbol, which is determined probabilistically with or without controller linked to all of the base games, causes all of the images in the video monitors of the video carousel to "spin" (clockwise or counter-clockwise) and land randomly in the same or new positions while preserving relative display order. In other embodiments of the video carousel bonus feature system, a random coin-in mystery symbol, which is determined probabilistically with or without controller linked to all the base games, causes all of the images in the video monitors of the video carousel to relocate to random positions which may include reappearing in the current position.

Continuing, in some embodiments of the video carousel bonus feature system, a random time-based mystery symbol, which is determined probabilistically with or without a controller linked to all the base games, causes all of the images in the video monitors of the video carousel to rotate (clockwise or counter-clockwise) at least one or more positions, while preserving relative display order. In other embodiments of the video carousel bonus feature system, a random time-based mystery symbol, which is determined probabilistically with or without a controller linked to all the base games, causes all the images in the video monitors of the video carousel to "spin" (clockwise or counter-clockwise) and land randomly in the same or new positions, while preserving relative display order. In still other embodiments of the video carousel bonus feature system, a random time-based mystery symbol, which is determined probabilistically with or without a controller linked to all the base games, causes all of the images in the video monitors of the video carousel to relocate to random positions. In some embodiments, relocating to random positions may include reappearing in the current position.

In one embodiment of the video carousel bonus feature system, a pre-determined coin-in value (with each subsequent value derived randomly immediately upon triggering an image manipulation) causes all of the images in the video monitors of the video carousel to rotate (clockwise or counter-clockwise) at least one or more positions while preserving relative display order. In another embodiment of the video carousel bonus feature system, a pre-determined coin-in value (with each subsequent value derived randomly immediately upon triggering an image manipulation) causes all of the images in the video monitors of the video carousel to "spin" (clockwise or counter-clockwise) and land randomly in the same or new positions while preserving relative display order. In still another embodiment of the video carousel bonus feature system, a pre-determined coin-in value (with each subsequent value derived randomly immediately upon triggering an image manipulation) causes all the images in the video monitors of the video carousel to relocate to random positions. In some embodiments, relocating to random positions may include reappearing in the current position.

In some embodiments of the video carousel bonus feature system, the completion of a video carousel feature on any base game in the carousel immediately causes all of the images in the video monitors of the video carousel to rotate (clockwise or counter-clockwise) one or more positions either randomly or as dictated by the symbol per the game rules (e.g., a numeric value on the symbol or color/shape is associated with a direction and a specific number of positions to rotate), while preserving relative display order. In other embodiments of the video carousel bonus feature system, the completion of a video carousel feature on any base game in the carousel immediately causes all the images in the video monitors of the video carousel to "spin" (clockwise or counter-clockwise) and land randomly in the same or new positions, while preserving relative display order. In still other embodiments of the video carousel bonus feature system, the completion of a video carousel feature on any base game in the carousel immediately causes all the images in the video monitors of the video carousel to relocate to random positions, which may include reappearing in the current position.

Figure 3:
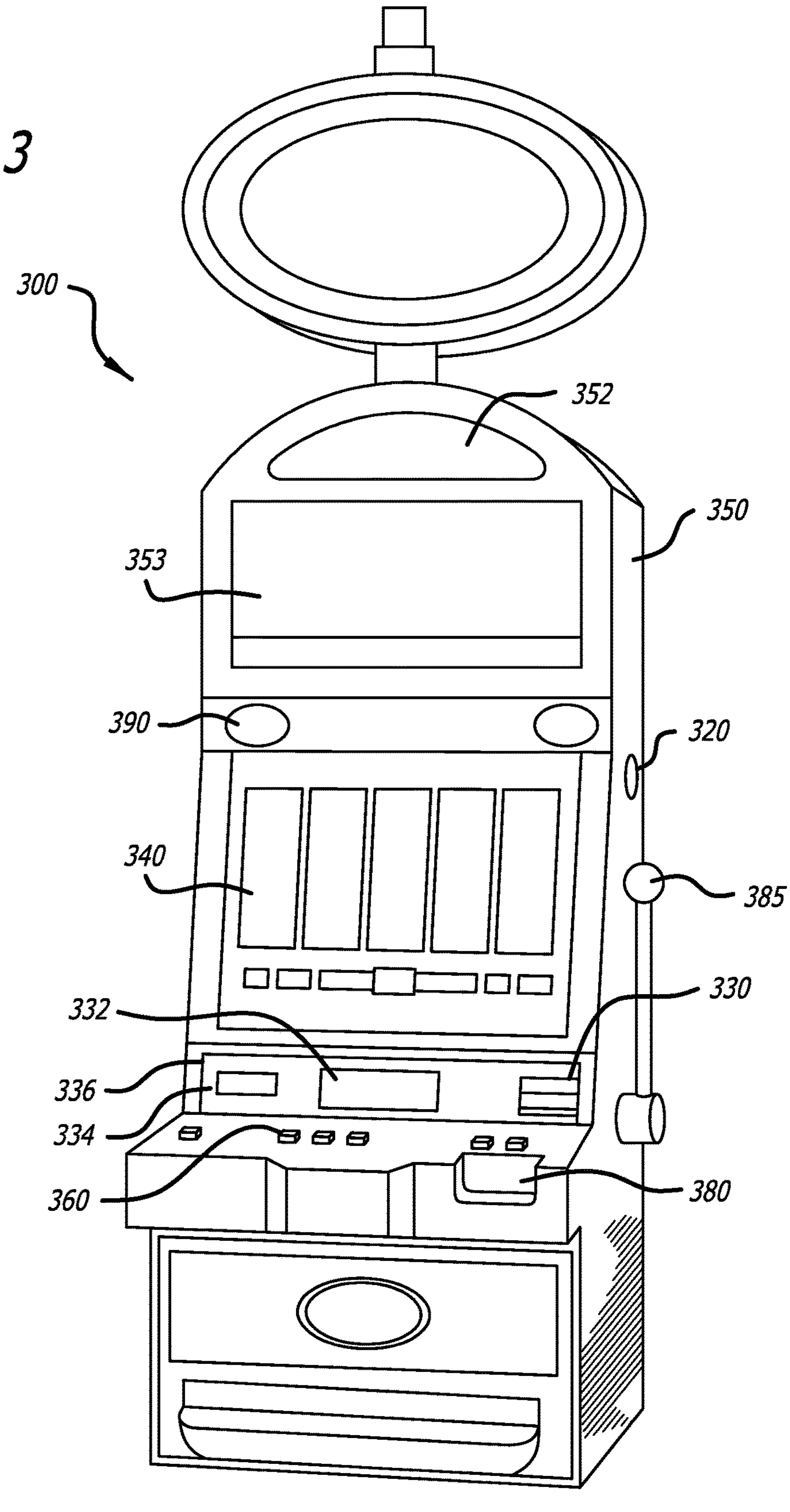
FIG. 3 illustrates a perspective view of a gaming machine in accordance with one or more embodiments.

Referring to FIG. 3, gaming machine 300 is capable of supporting various embodiments, including cabinet housing 320, primary game display 340 upon which a primary game and feature game may be displayed, top box 350 which may display multiple progressives that may be won during play of the feature game, player-activated buttons 360, player tracking panel 336, bill/voucher acceptor 380 and one or more speakers 390. Cabinet housing 320 may be a self-standing unit that is generally rectangular in shape and may be manufactured with reinforced steel or other rigid materials which are resistant to tampering and vandalism. Cabinet housing 320 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 300 or thin client capability such as that incorporating some of the capability of a remote server.

In one or more embodiments, cabinet housing 320 houses a processor, circuitry, and software (not shown) for receiving signals from the player-activated buttons 360, operating the games, and transmitting signals to the respective displays and speakers. Any shaped cabinet may be implemented with any embodiment of gaming machine 300 so long as it provides access to a player for playing a game. For example, cabinet 320 may comprise a slant-top, bar-top, or table-top style cabinet, including a Bally Cinevision™ or CineReels™ cabinet. The operation of gaming machine 300 is described more fully below.

The plurality of player-activated buttons 360 may be used for various functions such as, but not limited to, selecting a wager denomination, selecting a game to be played, selecting a wager amount per game, initiating a game, or cashing out money from gaming machine 300. Buttons 360 may be operable as input mechanisms and may include mechanical buttons, electromechanical buttons or touch screen buttons. Optionally, a handle 385 may be rotated by a player to initiate a game.

In one or more embodiments, buttons 360 may be replaced with various other input mechanisms known in the art such as, but not limited to, a touch screen system, touch pad, track ball, mouse, switches, toggle switches, or other input means used to accept player input such as a Bally iDeck™. One other example input means is a universal button module as disclosed in U.S. Patent Publication No. 20060247047, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 320 may optionally include top box 350 which contains "top glass" 352 comprising advertising or payout information related to the game or games available on gaming machine 300. Player tracking panel 336 includes player tracking card reader 334 and player tracking display 332. Voucher printer 330 may be integrated into player tracking panel 336 or installed elsewhere in cabinet housing 320 or top box 350.

Game display 340 may present a game of chance wherein a player receives one or more outcomes from a set of potential outcomes. For example, one such game of chance is a video slot machine game. In other aspects of the invention, gaming machine 300 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 340 is, typically, a CRT or a flat-panel display in the form of, but not limited to, liquid crystal, plasma, electroluminescent, vacuum fluorescent, field emission, or any other type of panel display known or developed in the art. Game display 340 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 340 may also present information such as, but not limited to, player information, advertisements and casino promotions, graphic displays, news and sports updates, or even offer an alternate game. This information may be generated through a host computer networked with gaming machine 300 on its own initiative or it may be obtained by request of the player using either one or more of the plurality of player-activated buttons 360; the game display itself, if game display 340 comprises a touch screen or similar technology; buttons (not shown) mounted about game display 340 which may permit selections such as those found on an ATM machine, where legends on the screen are associated with respective selecting buttons; or any player input device that offers the required functionality.

Cabinet housing 320 incorporates a single game display 340. However, in alternate embodiments, cabinet housing 320 or top box 350 may house one or more additional displays 353 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 4A:
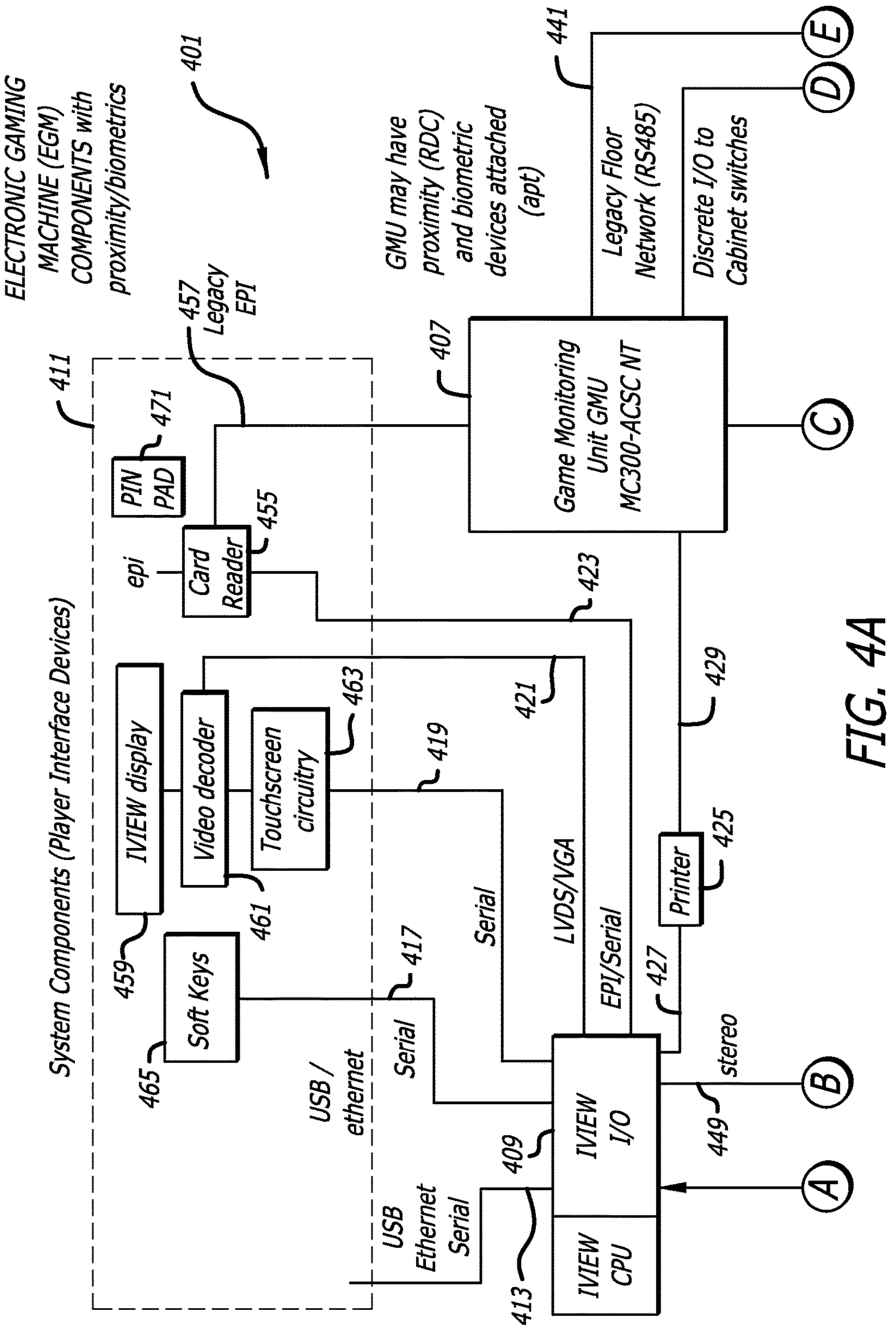
FIG. 4A illustrates a block diagram of the physical and logical components of the gaming machine of FIG. 3 in accordance with one or more embodiments.
Figure 4B:
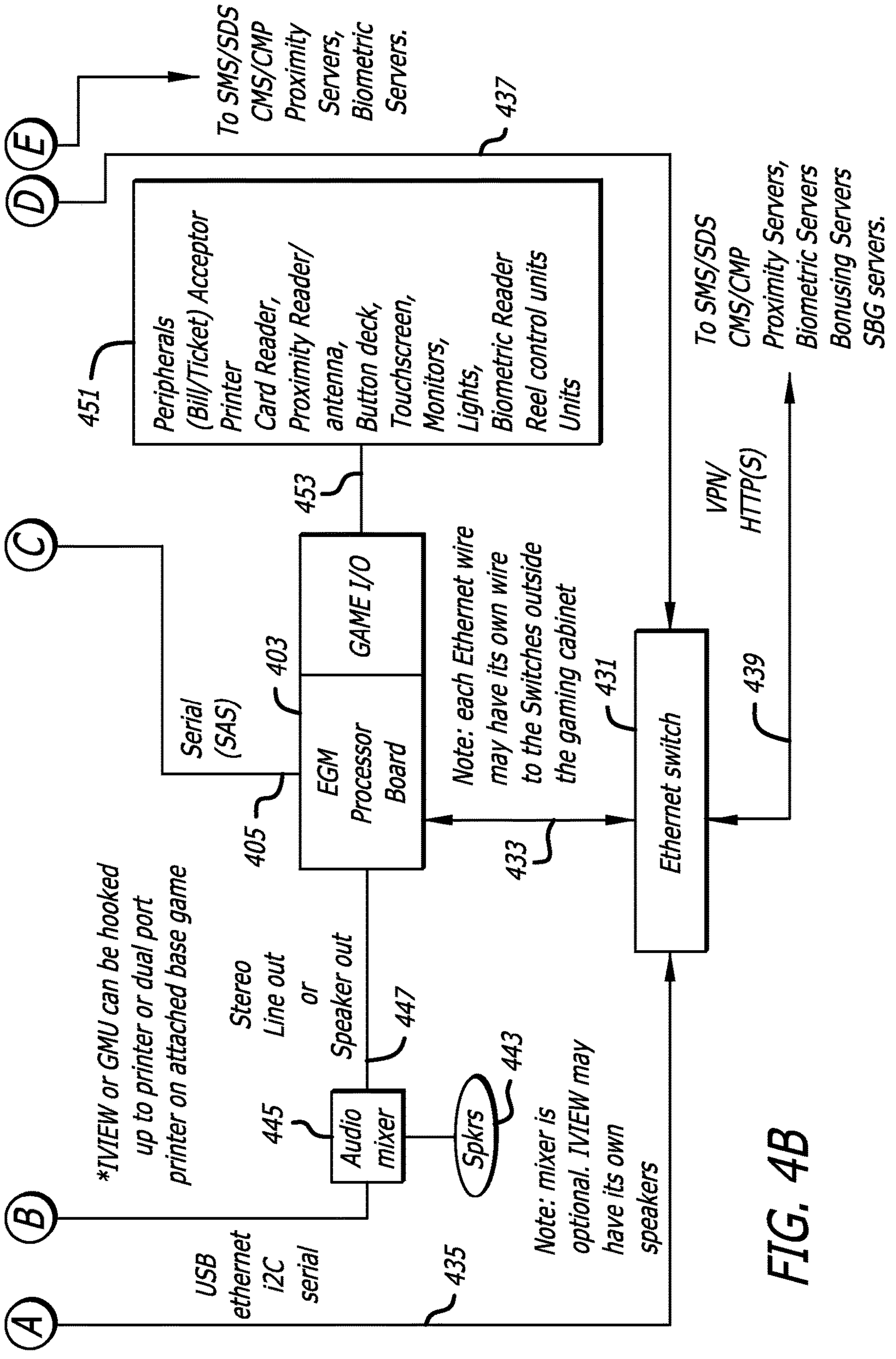
FIG. 4B illustrates a block diagram of the physical and logical components of the gaming machine of FIG. 3 in accordance with one or more embodiments.

Referring to FIGS. 4A and 4B, electronic gaming machine 401 is shown in accordance with one or more embodiments. Electronic gaming machine 401 includes base game integrated circuit board 403 (EGM Processor Board) connected through serial bus line 405 to game monitoring unit (GMU) 407 (such as a Bally MC300 or ACSC NT), and player interface integrated circuit board (PIB) 409 connected to player interface devices 411 over bus lines 413, 415, 417, 419, 421, 423. Printer 425 is connected to PIB 409 and GMU 407 over bus lines 427, 429. Base game integrated circuit board 403, PIB 409, and GMU 407 connect to Ethernet switch 431 over bus lines 433, 435, 437. Ethernet switch 431 connects to a slot management system (SMS) and a casino management system (CMS) network over bus line 439. GMU 407 also may connect to the SMS and CMS network over bus line 441. Speakers 443 connect through audio mixer 445 and bus lines 447, 449 to base game integrated circuit board 403 and PIB 409. The proximity and biometric devices and circuitry may be installed by upgrading a commercially available PIB 409, such as a Bally iView™ unit. Coding executed on base game integrated circuit board 403, PIB 409, and/or GMU 407 may be upgraded to integrate a game in accordance with one or more embodiments of the invention described herein, as is more fully described below.

Peripherals 451 connect through I/O board 453 to base game integrated circuit board 403. For example, a bill/ticket acceptor is typically connected to a game input-output board 453 which is, in turn, connected to a conventional central processing unit ("CPU") base game integrated circuit board 403, such as an Intel Pentium microprocessor mounted on a gaming motherboard. I/O board 453 may be connected to base game integrated circuit board 403 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 403 executes a game program that causes base game integrated circuit board 403 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 453 to base game integrated circuit board 403 which, in turn, assigns an appropriate number of credits for play in accordance with the game program. The player may further control the operation of the gaming machine by way of other peripherals 451, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 400; for example, it may be part of a central determination host system which provides random game outcomes to the game program. Thereafter, the player may or may not interact with the game through electromechanical or touch screen buttons to change the displayed indicia. Finally, base game integrated circuit board 403 under control of the game program and OS compares the final display of indicia to a pay table. The set of possible game outcomes may include a subset of outcomes related to the triggering of a feature game. In the event the displayed outcome is a member of this subset, base game integrated circuit board 403, under control of the game program and by way of I/O Board 453, may cause feature game play to be presented on a feature display.

Predetermined payout amounts for certain outcomes, including feature game outcomes, are stored as part of the game program. Such payout amounts are, in response to instructions from base game integrated circuit board 403, provided to the player in the form of coins, credits or currency via I/O board 453 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 407 includes an integrated circuit board and GMU processor and memory including coding for network communications, such as the G2S (game-to-system) protocol from the Gaming Standards Association, Las Vegas, Nev., used for system communications over the network. As shown, GMU 407 may connect to card reader 455 through bus 457 and may thereby obtain player card information and transmit the information over the network through bus 441. Gaming activity information may be transferred by the base game integrated circuit board 403 to GMU 407 where the information may be translated into a network protocol, such as S2S, for transmission to a server, such as a player tracking server, where information about a player's playing activity may be stored in a designated server database.

PIB 409 includes an integrated circuit board, PID processor, and memory which includes an operating system, such as Windows CE, a player interface program which may be executable by the PID processor together with various input/output (I/O) drivers for respective devices which connect to PIB 409, such as player interface devices 411, and which may further include various games or game components playable on PIB 409 or playable on a connected network server and PIB 409 is operable as the player interface. PIB 409 connects to card reader 455 through bus 423, display 459 through video decoder 461 and bus 421, such as an LVDS or VGA bus.

As part of its programming, the PID processor executes coding to drive display 459 and provide messages and information to a player. Touch screen circuitry interactively connects display 459 and video decoder 461 to PIB 409, such that a player may input information and cause the information to be transmitted to PIB 409 either on the player's initiative or responsive to a query by PIB 409. Additionally soft keys 465 connect through bus 417 to PIB 409 and operate together with display 459 to provide information or queries to a player and receive responses or queries from the player. PIB 409, in turn, communicates over the CMS/SMS network through Ethernet switch 431 and busses 435, 439 and with respective servers, such as a player tracking server.

Player interface devices 411 are linked into the virtual private network of the system components in gaming machine 401. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView™ processing board and game monitoring unit (GMU) processing board. The GMU and iView™ can be combined into one like the commercially available Bally GTM iView device. This device may have a video mixing technology to mix the EGM processor's video signals with the iView display onto the top box monitor or any monitor on the gaming device.

Figure 5:
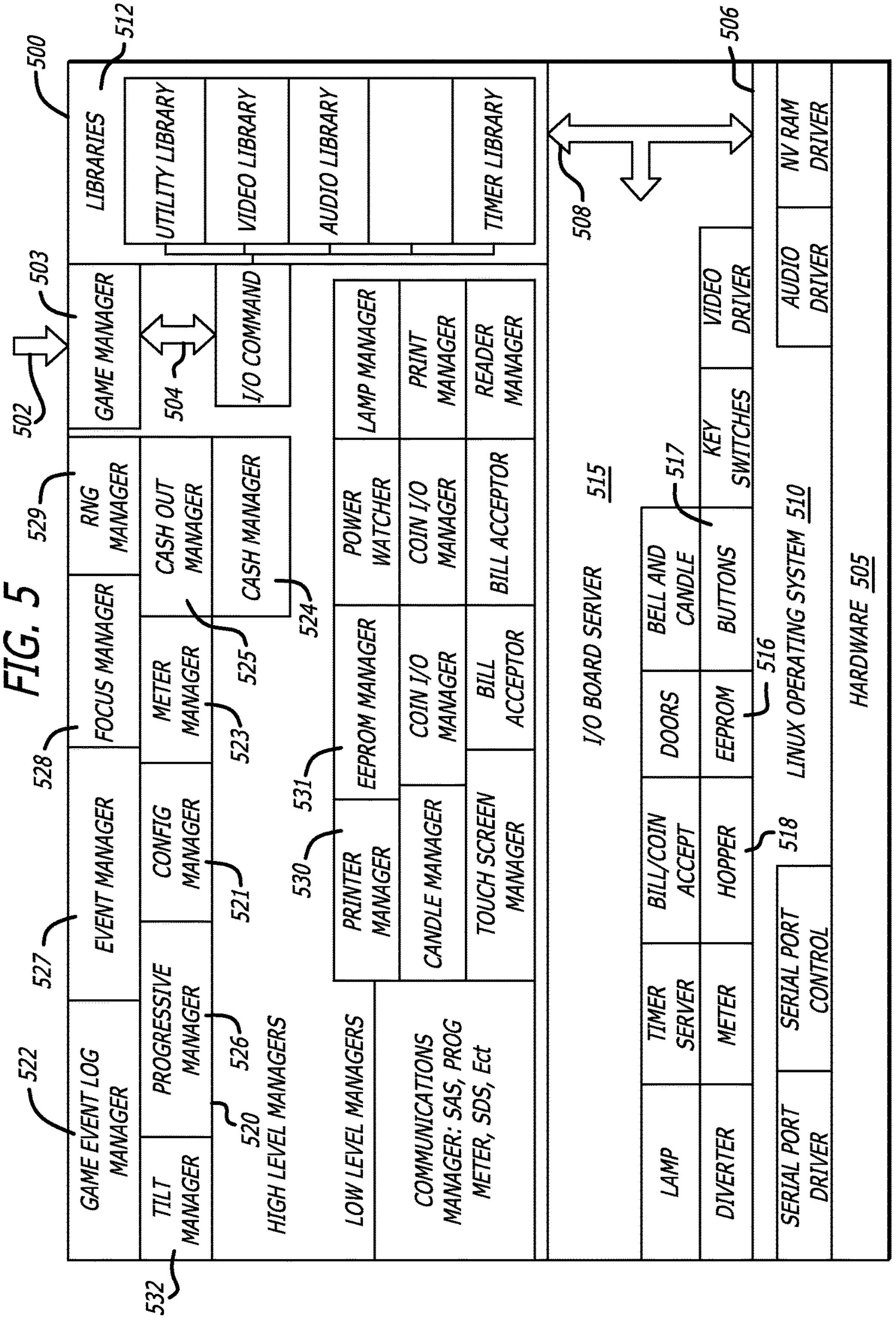
FIG. 5 illustrates a block diagram of the logical components of a gaming kernel in accordance with one or more embodiments.

In accordance with one or more embodiments, FIG. 5 is a functional block diagram of a gaming kernel 500 of a game program under control of base game integrated circuit board 503. The game program uses gaming kernel 500 by calling into application programming interface (API) 502, which is part of game manager 503. The components of game kernel 500 as shown in FIG. 5 are only illustrative, and should not be considered limiting. For example, the number of managers may be changed, additional managers may be added or some managers may be removed without deviating from the scope and spirit of the invention.

As shown in the example, there are three layers: a hardware layer 505; an operating system layer 510, such as, but not limited to, Linux; and a game kernel layer 500 having game manager 503 therein. In one or more embodiments, the use of a standard operating system 510, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 500 executes at the user level of the operating system 510, and itself contains a major component called the I/O Board Server 515. To properly set the bounds of game application software (making integrity checking easier), all game applications interact with gaming kernel 500 using a single API 502 in game manager 503. This enables game applications to make use of a well-defined, consistent interface, as well as making access points to gaming kernel 500 controlled, where overall access is controlled using separate processes.

For example, game manager 503 parses an incoming command stream and, when a command dealing with I/O comes in (arrow 504), the command is sent to an applicable library routine 512. Library routine 512 decides what it needs from a device, and sends commands to I/O Board Server 515 (see arrow 508). A few specific drivers remain in operating system 510's kernel, shown as those below line 506. These are built-in, primitive, or privileged drivers that are (i) general (ii) kept to a minimum and (iii) are easier to leave than extract. In such cases, the low-level communications is handled within operating system 510 and the contents passed to library routines 512.

Thus, in a few cases library routines may interact with drivers inside operating system 510, which is why arrow 508 is shown as having three directions (between library utilities 512 and I/O Board Server 515, or between library utilities 512 and certain drivers in operating system 510). No matter which path is taken, the logic needed to work with each device is coded into modules in the user layer of the diagram. Operating system 510 is kept as simple, stripped down, and common across as many hardware platforms as possible. The library utilities and user-level drivers change as dictated by the game cabinet or game machine in which it will run. Thus, each game cabinet or game machine may have a base game integrated circuit board 503 connected to a unique, relatively dumb, and as inexpensive as possible I/O adapter board 540, plus a gaming kernel 500 which will have the game-machine-unique library routines and I/O Board Server 515 components needed to enable game applications to interact with the gaming machine cabinet. Note that these differences are invisible to the game application software with the exception of certain functional differences (i.e., if a gaming cabinet has stereo sound, the game application will be able to make use of API 502 to use the capability over that of a cabinet having traditional monaural sound).

Game manager 503 provides an interface into game kernel 500, providing consistent, predictable, and backwards compatible calling methods, syntax, and capabilities by way of game application API 502. This enables the game developer to be free of dealing directly with the hardware, including the freedom to not have to deal with low-level drivers as well as the freedom to not have to program lower level managers 530, although lower level managers 530 may be accessible through game manager 503's interface 502 if a programmer has the need. In addition to the freedom derived from not having to deal with the hardware level drivers and the freedom of having consistent, callable, object-oriented interfaces to software managers of those components (drivers), game manager 503 provides access to a set of upper level managers 520 also having the advantages of consistent callable, object-oriented interfaces, and further providing the types and kinds of base functionality required in casino-type games. Game manager 503, providing all the advantages of its consistent and richly functional interface 502 as supported by the rest of game kernel 500, thus provides a game developer with a multitude of advantages.

Game manager 503 may have several objects within itself, including an initialization object (not shown). The initialization object performs the initialization of the entire game machine, including other objects, after game manager 503 has started its internal objects and servers in appropriate order. In order to carry out this function, the kernel's configuration manager 521 is among the first objects to be started; configuration manager 521 has data needed to initialize and correctly configure other objects or servers.

The upper level managers 520 of game kernel 500 may include game event log manager 522 which provides, at the least, a logging or logger base class, enabling other logging objects to be derived from this base object. The logger object is a generic logger; that is, it is not aware of the contents of logged messages and events. The log manager's (522) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 523 manages the various meters embodied in the game kernel 500. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 523 receives its initialization data for the meters, during start-up, from configuration manager 521. While running, the cash in (524) and cash out (525) managers call the meter manager's (523) update functions to update the meters. Meter manager 523 will, on occasion, create backup copies of the soft meters by storing the soft meters' readings in EEPROM. This is accomplished by calling and using EEPROM manager 531.

In accordance with still other embodiments, progressive manager 526 manages progressive games playable from the game machine. Event manager 527 is generic, like log manager 522, and is used to manage various gaming machine events. Focus manager 528 correlates which process has control of various focus items. Tilt manager 532 is an object that receives a list of errors (if any) from configuration manager 521 at initialization, and during game play from processes, managers, drivers, etc. that may generate errors. Random number generator manager 529 is provided to allow easy programming access to a random number generator (RNG), as a RNG is required in virtually all casino-style (gambling) games. RNG manager 529 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 525 has the responsibility of configuring and managing monetary output devices. During initialization, cash out manager 525, using data from configuration manager 521, sets the cash out devices correctly and selects any selectable cash out denominations. During play, a game application may post a cash out event through the event manager 527 (the same way all events are handled), and using a call-back posted by cash out manager 525, cash out manager 525 is informed of the event. Cash out manager 525 updates the credit object, updates its state in non-volatile memory, and sends an appropriate control message to the device manager that corresponds to the dispensing device. As the device dispenses dispensable media, there will typically be event messages being sent back and forth between the device and cash out manager 525 until the dispensing finishes, after which cash out manager 525, having updated the credit manager and any other game state (such as some associated with meter manager 523) that needs to be updated for this set of actions, sends a cash out completion event to event manager 527 and to the game application thereby. Cash in manager 524 functions similarly to cash out manager 525, only controlling, interfacing with, and taking care of actions associated with cashing in events, cash in devices, and associated meters and crediting.

In a further example, in accordance with one or more embodiments, I/O server 515 may write data to the gaming machine EEPROM memory, which is located in the gaming machine cabinet and holds meter storage that must be kept even in the event of power failure. Game manager 503 calls the I/O library functions to write data to the EEPROM. The I/O server 515 receives the request and starts a low priority EEPROM thread 516 within I/O server 515 to write the data. This thread uses a sequence of 8 bit command and data writes to the EEPROM device to write the appropriate data in the proper location within the device. Any errors detected will be sent as IPC messages to game manager 503. All of this processing is asynchronous.

In accordance with one embodiment, button module 517 within I/O server 515, polls (or is sent) the state of buttons every 2 ms. These inputs are debounced by keeping a history of input samples. Certain sequences of samples are required to detect a button was pressed, in which case the I/O server 515 sends an inter-process communication event to game manager 503 that a button was pressed or released. In some embodiments, the gaming machine may have intelligent distributed I/O which debounces the buttons, in which case button module 517 may be able to communicate with the remote intelligent button processor to get the button events and simply relay them to game manager 503 via IPC messages. In still another embodiment, the I/O library may be used for pay out requests from the game application. For example, hopper module 518 must start the hopper motor, constantly monitor the coin sensing lines of the hopper, debounce them, and send an IPC message to the game manager 503 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 6A:
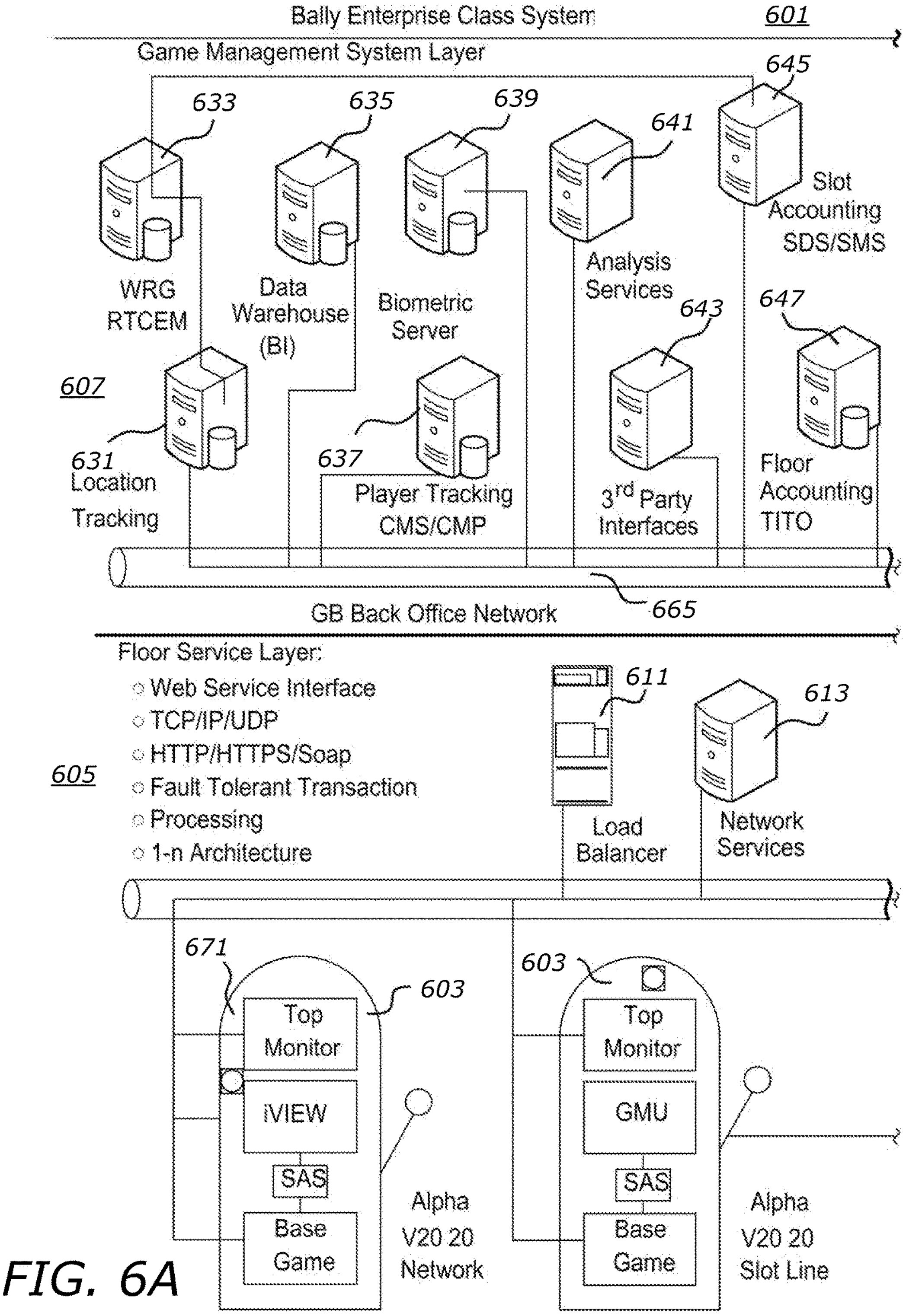
FIG. 6A illustrates a schematic block diagram showing the hardware elements of a networked gaming system in accordance with one or more embodiments.
Figure 6B:
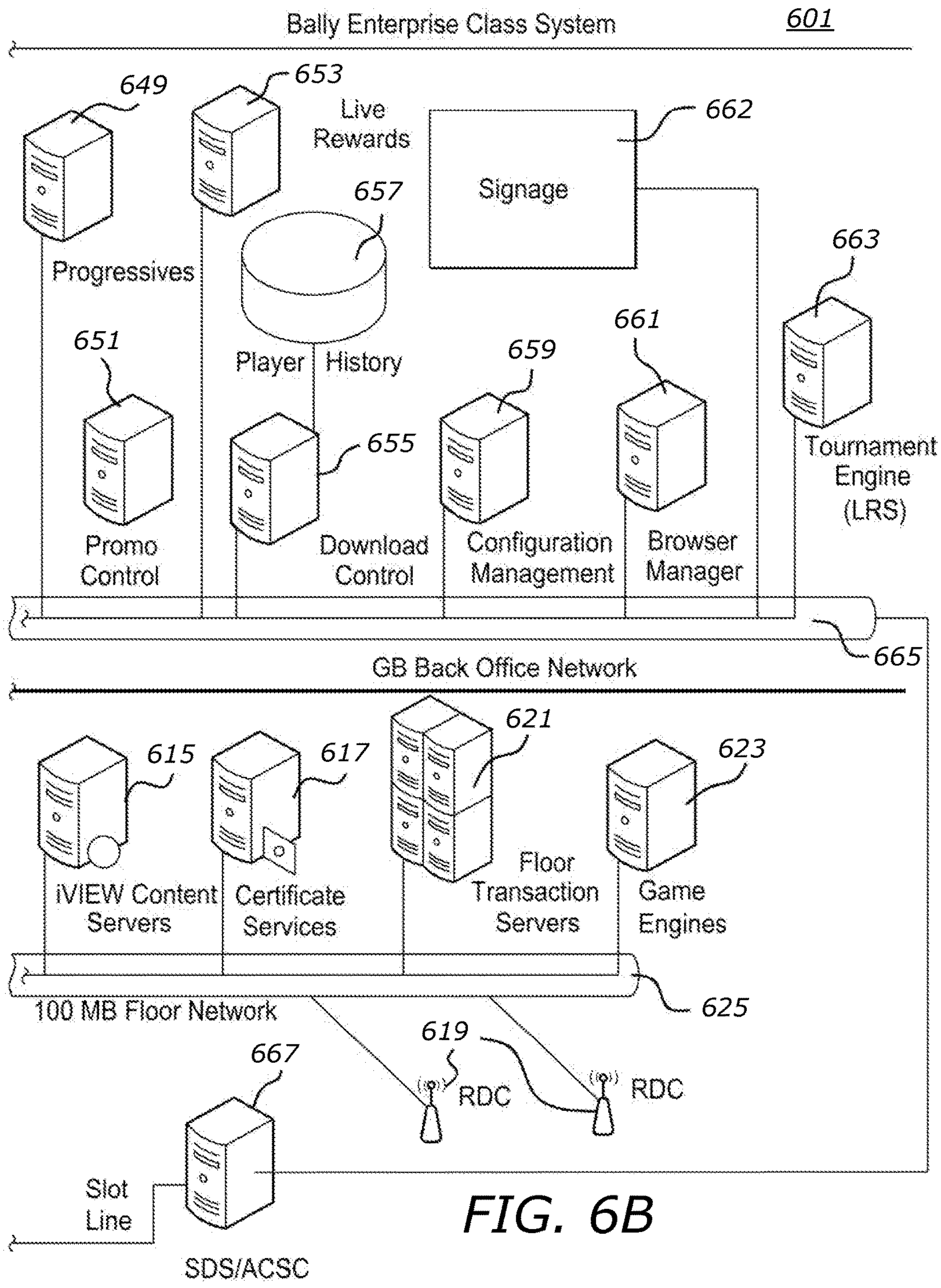
FIG. 6B illustrates a schematic block diagram showing the hardware elements of a networked gaming system in accordance with one or more embodiments.

Referring to FIGS. 6A and 6B, enterprise gaming system 601 is shown in accordance with one or more embodiments. Enterprise gaming system 601 may include one casino or multiple locations and generally includes a network of gaming machines 603, floor management system (SMS) 605, and casino management system (CMS) 607. SMS 605 may include load balancer 611, network services servers 613, player interface (iView) content servers 615, certificate services server 617, floor radio dispatch receiver/transmitters (RDC) 619, floor transaction servers 621 and game engines 623, each of which may connect over network bus 625 to gaming machines 603. CMS 607 may include location tracking server 631, WRG RTCEM server 633, data warehouse server 635, player tracking server 637, biometric server 639, analysis services server 641, third party interface server 643, slot accounting server 645, floor accounting server 647, progressives server 649, promo control server 651, feature game (such as Bally Live Rewards) server 653, download control server 655, player history database 657, configuration management server 659, browser manager 661, tournament engine server 663 connecting through bus 665 to server host 667 and gaming machines 603. The various servers and gaming machines 603 may connect to the network with various conventional network connections (such as, for example, USB, serial, parallel, RS485, Ethernet). Additional servers which may be incorporated with CMS 607 include a responsible gaming limit server (not shown), advertisement server (not shown), and a control station server (not shown) where an operator or authorized personnel may select options and input new programming to adjust each of the respective servers and gaming machines 603. SMS 605 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 603 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 607 and/or SMS 605 servers and devices, firmware, media, operating systems, and configurations may be downloaded to the system components of respective gaming machines for upgrading or managing floor content and offerings in accordance with operator selections or automatically depending upon CMS 607 and SMS 605 master programming. The data and programming updates to gaming machines 603 are authenticated using conventional techniques prior to install on the system components.

In various embodiments, any of the gaming machines 603 may be a mechanical reel spinning slot machine or a video slot machine or a gaming machine offering one or more of the above described games including a group play game. Alternately, gaming machines 603 may provide a game with a simulated musical instrument interface as a primary or base game or as one of a set of multiple primary games selected for play by a random number generator. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. Patent Publication No. 20080139305, entitled "Networked System and Method for Group Play Gaming," filed on Nov. 9, 2007, which is hereby incorporated by reference in its entirety for all purposes.

Figure 7:
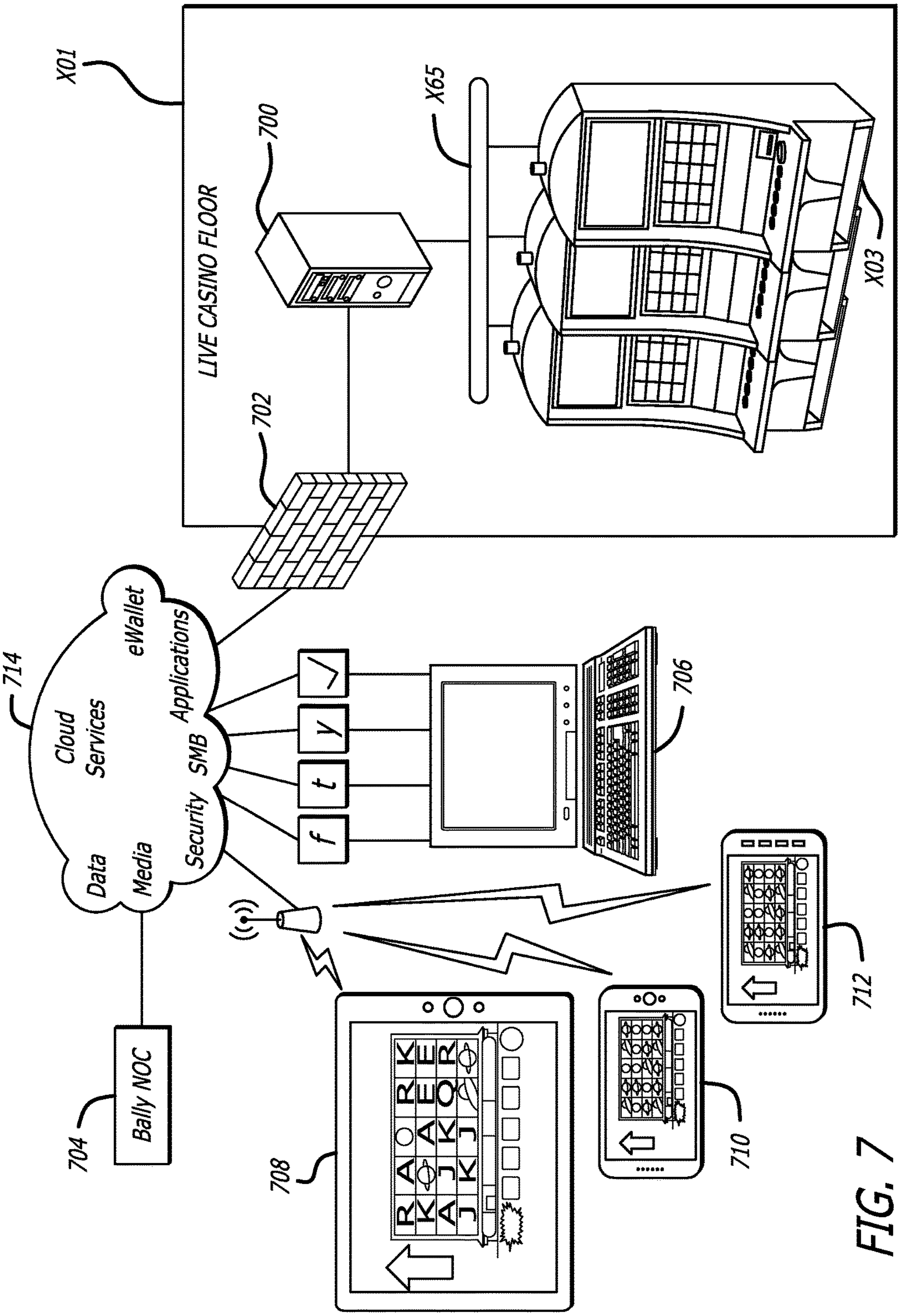
FIG. 7 illustrates a diagram showing an example of architecture for tying a casino enterprise network to an external provider of games and content to Internet or broadband communication capable devices.

All or portions of the present invention may also be implemented or promoted by or through a system as suggested in FIG. 7. At 601 is the gaming system of FIGS. 6A and 6B, which may be hosted at a casino property enterprise, across several casino enterprises or by a third party host. As described above, the gaming system 601 has a network communication bus 665 providing for communication between the gaming terminals 603 and various servers. To provide the functionality illustrated in FIG. 7, a bonusing server 700, such as a Bally Elite Bonusing Server is connected to the network communication bus 665 (FIGS. 6A and 6B) for communication to the gaming system 601, the gaming terminals 603 and the various servers and other devices as described above. Through a secure network firewall 702 the bonusing server 700 is in communication with a cloud computing/storage service 704 which may be hosted by the casino enterprise, a licensed third party or if permitted by gaming regulators an unlicensed provider. For example the cloud service 704 may be as provided by Microsoft® Private Cloud Solutions offered by Microsoft Corp. of Redmond, Wash., USA. The cloud service 704 provides various applications which can be accessed and delivered to, for example, personal computers 706, portable computing devices such as computer tablets 708, personal digital assistants (PDAs) 710 and cellular devices 712 such as telephones and smart phones. As but an example, the cloud service 704 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonusing or comps to players, or other applications. The cloud service 704 includes security provided for secure communication with the cloud service 704 between the player/users and the cloud service 704 and between the cloud service 704 and the gaming system 601. Security applications may be through encryption, the use of personal identification numbers (PINS) or other devices and systems. As suggested in FIG. 7, the cloud service 714 stores player/user data retrieved from players/users and from the gaming system 601.

The players/users may access the cloud service 704 and the applications and data provided thereby through the Internet or through broadband wireless cellular communication systems and any intervening short range wireless communication such as WiFi. The players/users may access the applications and data through various social media offerings such as Facebook, Twitter, Yelp, MySpace, LinkedIn or the like.

As but an example, a player/user may have a player account with a casino enterprise Z. That account may include data such as the player's credit level, their rating and their available comps. The account may further track any certificates, and the present value thereof, the player may have won as a result of the playing a game according to the present invention. At their smart phone 712 the player/user sends a request to the cloud service 704 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 704 forwards the inquiry to the bonusing servicer 700 which, in turn, confirms the PIN and retrieves the requested information from the data warehouse 635 (FIGS. 6A & 6B) or player tracking CMS/CMP server 637 (FIGS. 6A & 6B). Alternatively the data may be stored in the cloud service 704 and routinely updated from the data warehouse 635 or player tracking CMS/CMP server 637. In this instance the request would be responded to from data residing with the cloud service 704. The information is formatted by the cloud server 704 application and delivered to the player/user. The delivery may be formatted based upon the player/user's device operating system (OS), display size or the like.

The cloud service 700 may also host game applications to provide virtual instances of games for free, promotional, or where permitted, P2P (Pay to Play) supported gaming. Third party developers may also have access to placing applications with the cloud service 704 through, for example a national operations center (Bally NOC 714). A game software manufacturer such as Bally Gaming, Inc. may also provide game applications on its own or on behalf of the casino enterprise.

Other media such as advertising, notices (such as an upcoming tournament) may also be provided to the cloud service 704. When a player/user accesses the cloud service 704 certain media may be delivered to the player/user in a manner formatted for their application and device.

While the embodiment described relates to a Baccarat game it should be understood that the inventive concept could be applied to other games particularly those where inter-play player decisions are not required. For example, a slot machine, either electro-mechanical or video may operate one or more virtual games in the background and routinely report an outcome history to the player playing the primary, displayed, version of the game. The player may then compare the histories to the primary game and choose to instead play one of the one or more virtual background versions of the game. Each game version may operate from a differently seeded random number generator so the results (and histories may differ).

Still further the histories may be displayed at a window to either side, above or below the primary game version being wagered upon and played by the player or in a scrolling, ticker display again above or below or to either side of the primary game display. In such a fashion the player may view the histories and select a version of the game which the player may feel is "hotter" and is having better outcomes.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed:

1. A multi-player video gaming system that includes gaming presentations for a plurality of players, the system comprising:

one or more game processors;

a plurality of base game cabinets that each contain base game presentations that displays a base game;

a video carousel with a plurality of video monitors, wherein each of the plurality of video monitors is positioned above a base game cabinet, wherein a visual representation of one or more bonus features is displayed independently on each video monitor of the video carousel;

a memory storage device storing instructions to be executed by at least one of the processors and configured to:

award one of the plurality of players at least one bonus feature based on triggering criteria at a base game cabinet, wherein the awarded bonus feature coincides with the visual representation of the bonus feature being displayed on the video carousel monitor positioned directly above the triggering base game cabinet; and manipulate the visual representation displayed on each video monitor in the video carousel such that the visual representations of the bonus features appear to move from video monitor to video monitor on the video carousel in a clockwise or counter-clockwise motion until above the triggering base game cabinet, after which the visual representation of the bonus feature drops onto a correlating base game.

2. The system of claim 1, wherein a special symbol appearing on a base game causes images on each video monitor of the video carousel to rotate at least one position while preserving relative display order.

3. The system of claim 1, wherein a special symbol appearing on a base game causes images on each video monitor of the video carousel to spin and land randomly on a same or new position while preserving relative display order.

4. The system of claim 1, wherein a special symbol appearing on a base game causes images on each video monitor of the video carousel to relocate to random positions.

5. The system of claim 1, wherein a random mystery symbol that is determined probabilistically with respect to coin-input into the base game causes images on each video monitor of the video carousel to rotate at least one position while preserving relative display order.

6. The system of claim 1, wherein a random mystery symbol that is determined probabilistically with respect to coin-input into the base game causes images on each video monitor of the video carousel to spin and land randomly on a same or new position while preserving relative display order.

7. The system of claim 1, wherein a random mystery symbol that is determined probabilistically with respect to coin-input into the base game causes images on each video monitor of the video carousel to relocate to random positions.

8. The system of claim 1, wherein a random mystery symbol that is determined probabilistically with respect to time causes images on each video monitor of the video carousel to rotate at least one position while preserving relative display order.

9. The system of claim 1, wherein a random mystery symbol that is determined probabilistically with respect to time causes images on each video monitor of the video carousel to spin and land randomly on a same or new position while preserving relative display order.

10. The system of claim 1, wherein a random mystery symbol that is determined probabilistically with respect to time causes images on each video monitor of the video carousel to relocate to random positions.

11. The system of claim 1, wherein a pre-determined value of coin-input into the base game, which is derived randomly upon triggering an image manipulation, causes images on each video monitor of the video carousel to rotate at least one position while preserving relative display order.

12. The system of claim 1, wherein a pre-determined value of coin-input into the base game, which is derived randomly upon triggering an image manipulation, causes images on each video monitor of the video carousel to spin and land randomly on a same or new position while preserving relative display order.

13. The system of claim 1, wherein a pre-determined value of coin-input into the base game, which is derived randomly upon triggering an image manipulation, causes images on each video monitor of the video carousel to relocate to random positions.

14. The system of claim 1, wherein completion of a video carousel feature on a base game in the video carousel causes images on each video monitor of the video carousel to rotate at least one position while preserving relative display order.

15. The system of claim 1, wherein completion of a video carousel feature on a base game in the carousel causes images on each video monitor of the video carousel to spin and land randomly on a same or new position while preserving relative display order.

16. The system of claim 1, wherein completion of a video carousel feature on a base game in the carousel causes images on each video monitor of the video carousel to relocate to random positions.

17. A video gaming system that includes one or more gaming presentations for one or more players, the system comprising:

one or more game processors;

a base game cabinet that contains a base game presentation that displays a base game;

a video carousel with a plurality of video monitors, wherein at least one of the plurality of video monitors is positioned above the base game cabinet, wherein a visual representation of one or more bonus features is displayed independently on each video monitor of the video carousel;

a memory storage device storing instructions to be executed by at least one of the processors and configured to:

award a player at least one bonus feature based on triggering criteria at the base game cabinet, wherein the awarded bonus feature coincides with the visual representation of the bonus feature being displayed on the video carousel monitor positioned above the triggering base game cabinet; and manipulate the visual representation displayed on each video monitor in the video carousel such that the visual representations of the bonus features appear to move from video monitor to video monitor on the video carousel in a clockwise or counter-clockwise motion until above the triggering base game cabinet, after which the visual representation of the bonus feature drops onto a correlating base game.

18. The system of claim 17, wherein a special symbol appearing on a base game causes images on each video monitor of the video carousel to rotate at least one position while preserving relative display order.

19. The system of claim 17, wherein a special symbol appearing on a base game causes images on each video monitor of the video carousel to spin and land randomly on a same or new position while preserving relative display order.

20. The system of claim 17, wherein a special symbol appearing on a base game causes images on each video monitor of the video carousel to relocate to random positions.

21. A multi-player video gaming system that includes gaming presentations for a plurality of players, the system comprising:

one or more game processors;

a plurality of base game cabinets that each contain base game presentations that display base games;

a video carousel with a plurality of video monitors, wherein each of the plurality of video monitors is positioned above a base game cabinet, wherein a visual representation of one or more bonus features is displayed independently on each video monitor of the video carousel in a clockwise or counter-clockwise motion until above the triggering base game cabinet, after which the visual representation of the bonus feature drops onto a correlating base game;

a memory storage device storing instructions to be executed by at least one of the processors and configured to award one of the plurality of players at least one bonus feature that appears to move from video monitor to video monitor on the video carousel, wherein the awarded bonus feature coincides with the visual representation of the bonus feature being displayed on the video carousel monitor positioned directly above the triggering base game cabinet.

22. The system of claim 21, wherein a special symbol appearing on a base game causes images on each video monitor of the video carousel to rotate at least one position while preserving relative display order.

23. The system of claim 21, wherein a special symbol appearing on a base game causes images on each video monitor of the video carousel to spin and land randomly on a same or new position while preserving relative display order.

24. The system of claim 21, wherein a special symbol appearing on a base game causes images on each video monitor of the video carousel to relocate to random positions.

* * * * *